March 29, 1966        R. MORALES        3,242,658

LAWN MOWER WITH BALER FOR CLIPPINGS

Filed March 24, 1964        3 Sheets-Sheet 1

INVENTOR.
RICHARD MORALES
BY
Julean Caplan
ATTORNEY

March 29, 1966 R. MORALES 3,242,658
LAWN MOWER WITH BALER FOR CLIPPINGS
Filed March 24, 1964 3 Sheets-Sheet 2

INVENTOR.
RICHARD MORALES
BY
ATTORNEY

March 29, 1966  R. MORALES  3,242,658
LAWN MOWER WITH BALER FOR CLIPPINGS
Filed March 24, 1964  3 Sheets-Sheet 3

INVENTOR.
RICHARD MORALES
BY
Julian Caplan
ATTORNEY

United States Patent Office
3,242,658
Patented Mar. 29, 1966

3,242,658
LAWN MOWER WITH BALER FOR CLIPPINGS
Richard Morales, 367 Rutherford Ave.,
Redwood City, Calif.
Filed Mar. 24, 1964, Ser. No. 354,407
8 Claims. (Cl. 56—22)

This invention relates to a new and improved lawn mower with a baler for grass clippings. More particularly, the present invention provides a unitary lawn mower which is power driven and which has incorporated therein and driven off the same engine that drive the mower a baler for grass clippings.

One of the problems of householders, gardeners, greenskeepers and the like is the disposal of grass clippings. Although various styles of grass-catching baskets are attached to mowers, nevertheless the disposal of the clippings and handling prior to disposal present a problem. In accordance with the present invention, the clippings are deposited in a baling chamber and compressed with provision made for retaining the compressed clippings in the form of small bricks which are conveniently disposable.

Accordingly, it is a principal object and purpose of the present invention to provide a power-actuated baler driven by the same engine that drives the mower and operable to compress clippings into bricks and then bind the bricks to retain their form prior to disposal of the clippings.

A still further object of the invention is to provide means whereby clippings are conveyed by the air blast of the cutter reel through a duct and thence into the opening in the baling column.

A still further feature of the invention is the provision of means associated with the baling mechanim which drives a staple or similar deformable fastener through the brick at intervals, the staple retaining the brick in shape.

A still further feature of the invention is the provision of automatic means for actuating the stapling mechanism at intervals so as to produce and bind a brick of convenient size.

Other objects of the present invention will become apparent upon reading the following specification and referring to the accompanying drawings in which similar characters of reference represent corresponding parts in each of the several views.

Figure 1:
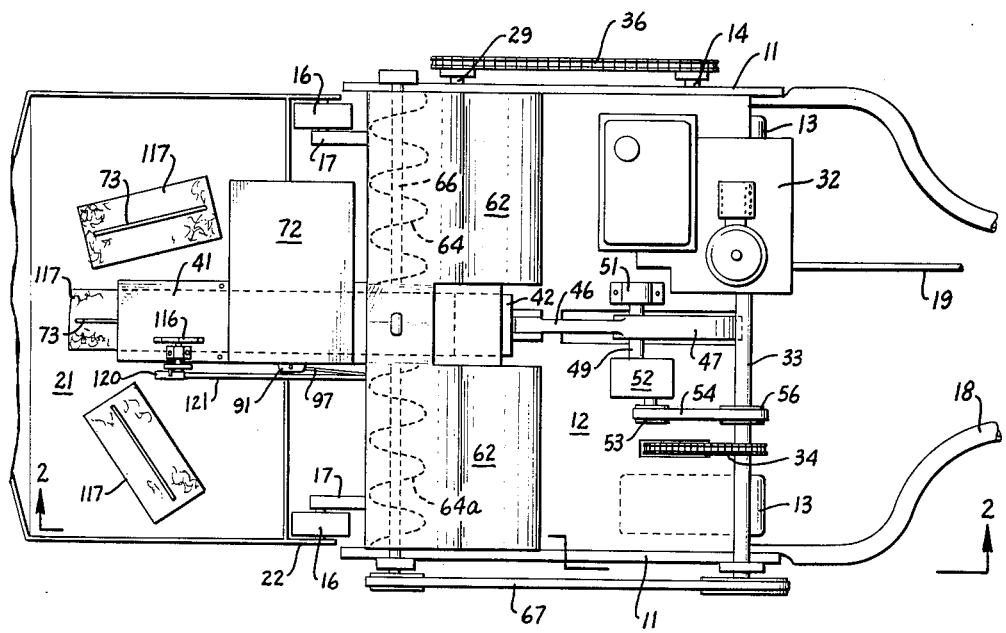
FIG. 1 is a top plan view of a mower in accordance with the present invention.
Figure 2:
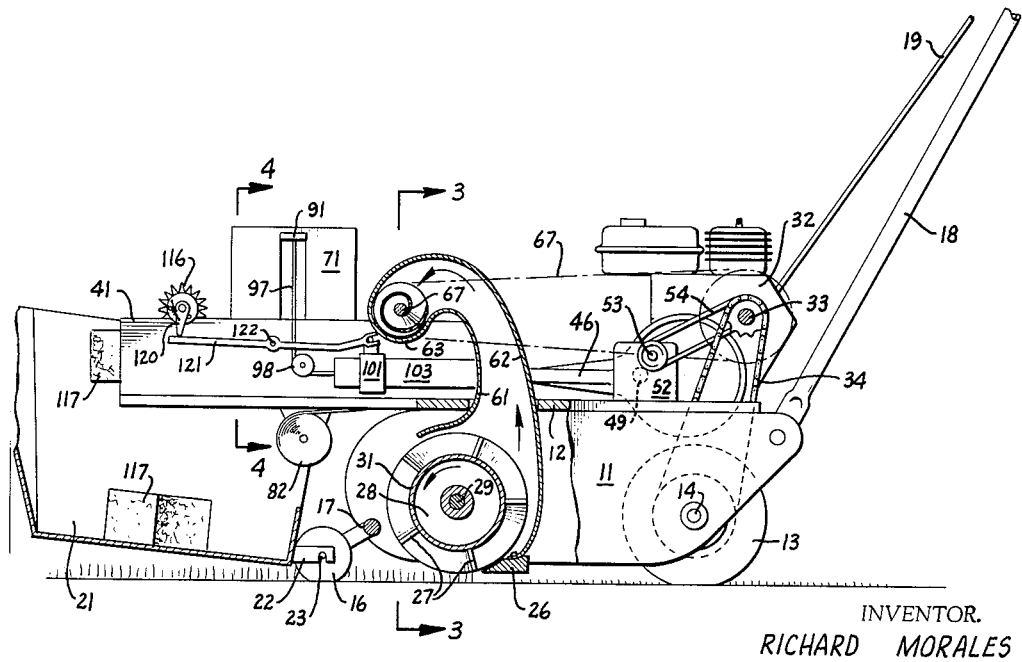
FIG. 2 is a sectional view taken substantially along the line 2—2 of FIG. 1.
Figure 3:
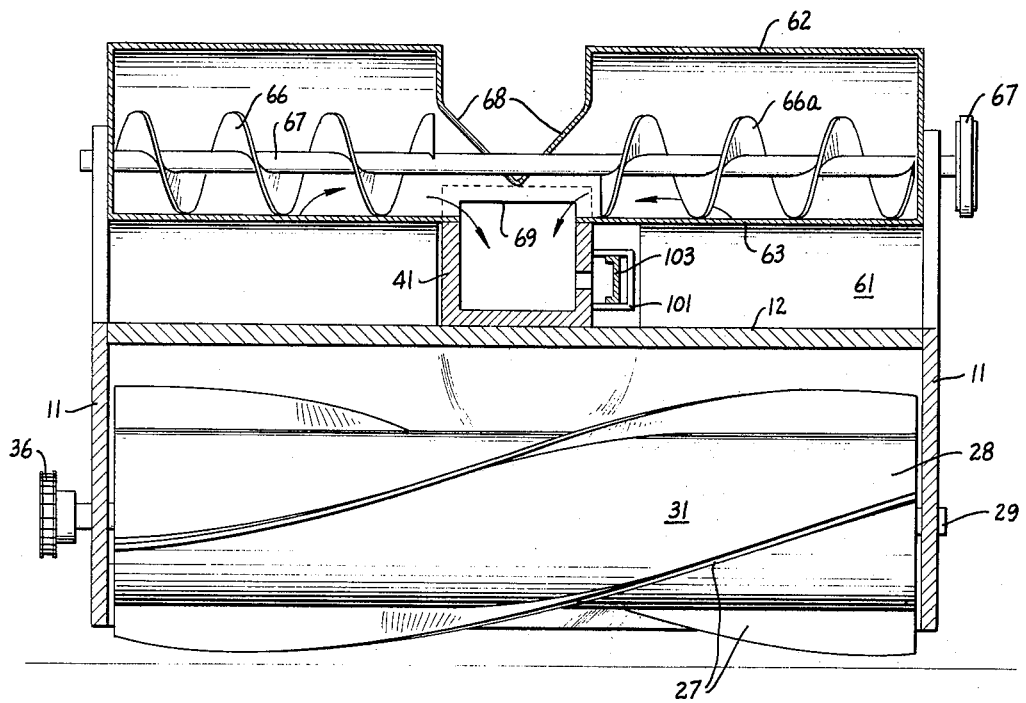
Figure 4:
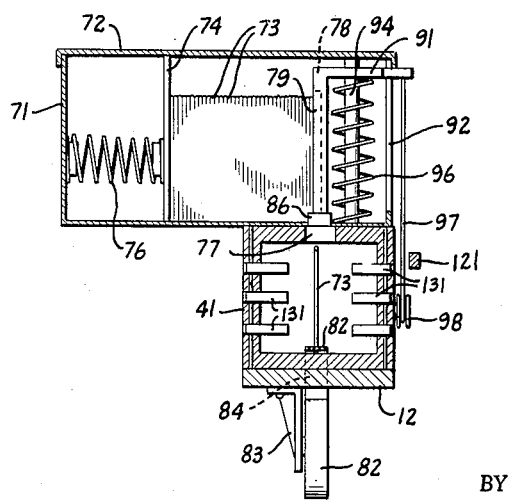

FIGS. 3 and 4 are respectively transverse fragmentary sectional views taken substantially along the lines 3—3 and 4—4 of FIG. 2.

Figure 5:
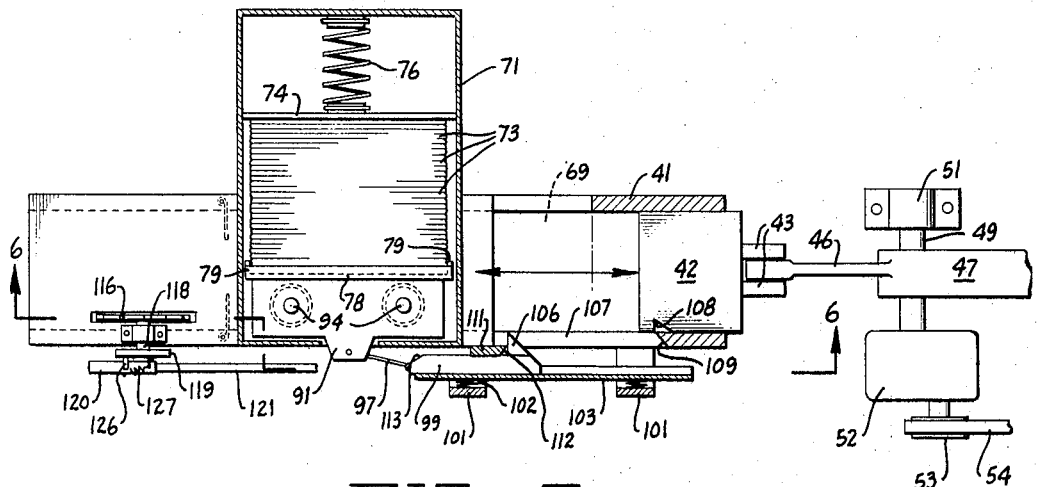
Figure 6:
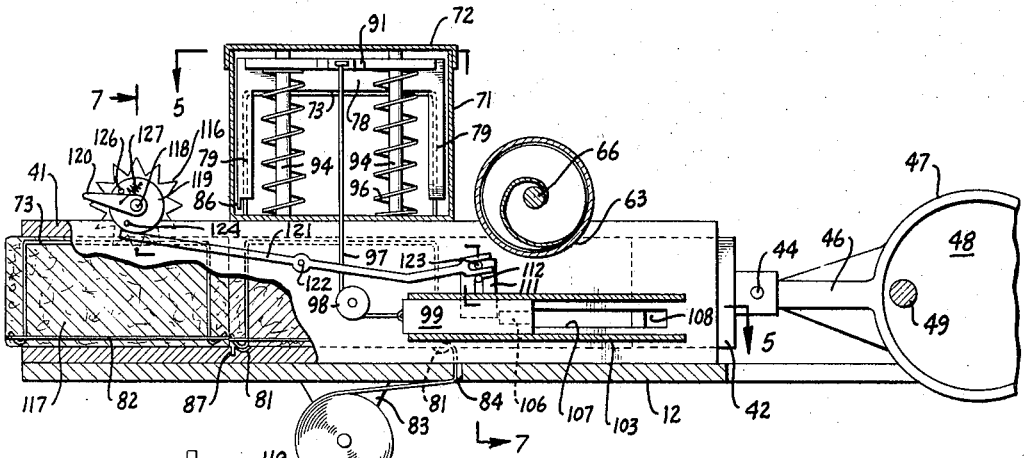

FIG. 5 is an enlarged fragmentary sectional view through the stapling mechanism as indicated by arrows, 5—5 in FIG. 6.

FIG. 6 is a vertical sectional view taken substantially along the line 6—6 of FIG. 5.

Figure 7:
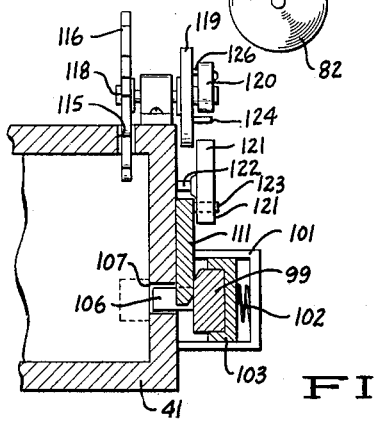

FIG. 7 is a further enlarged fragmentary transverse sectional view taken substantially along the line 7—7 in FIG. 6.

The baling mechanism hereinafter described in detail is incorporated herein in a lawn mower of more or less conventional design which is well-known in the mower industry and hence is not completely illustrated and described herein. Such a mower has vertical side plates 11 interconnected by horizontal top platform 12 which comprise the main frame of the machine. The rear of the main frame is supported by ground-engaging wheels 13 having axles 14 journalled in plates 11 and further having a height adjusting roller 16 supported by bracket 17 in the front of the machine. The frame is steered by guide handle 18 and its advance is controlled by various controls illustrated generally by reference numeral 19, all as well understood in the baler art. A grass clipping basket 21 in this form of machine is supported adjacent the front by means of hooks 22 engaging roller axle 23 and otherwise supported by means not shown.

The frame of the mower supports a transverse cutter bar 26 which cooperates with a plurality of spiral blades 27 on reel 28 which is mounted for the rotation with reel shaft 29 journalled in blades 11. In this form of the invention, an annular shroud 31 is fixed to reel 28 and rotatable therewith immediately inside cutter blades 27 and thus the reel 28 functions as a fan or blower to blow clippings clipped between blades 27 and bar 26 into the baler attachment as hereinafter explained.

The mower herein illustrated uses a gasoline engine 32 mounted on platform 12, it being understood that other prime movers such as electric motors can be used. The drive between the engine 32 and the various movable parts is subject to wide variation. In a form herein illustrated the shaft 33 of engine 32 is extended across the machine. A chain 34 is turned by the shaft 33 and down to shaft 14 of ground wheels 13. A second chain 36 drives off one of the ground wheels 13 to shaft 29 of cutter reel 28, all as well understood in the lawn mower art. Shaft 33 also drives the baler attachment hereinafter described, and hence engine 32 is preferably of somewhat greater capacity than is normally used for a lawn mower of the size to which no baler is attached.

A horizontal, forwardly-opening, centrally-disposed baling column 41 is mounted on the forward end of platform 12 and discharges above grass-catching basket 21. Horizontally reciprocal inside column 41 is ram 42 having lugs 43 connected by wrist pin 44 to connecting rod 46. Rod 46 is fixed to eccentric strap 47 which surrounds eccentric 48 on shaft 49. Shaft 49 is supported on platform 12 by pillow blocks 51 and gear drive 52. Drive 52 is driven by means of its input shaft sprocket 53 and chain 54 from sprocket 56 on shaft 33. Accordingly, engine 32 causes reciprocation of ram 42 in a manner well-known in the baling art.

Sheet metal ducts fore and aft and indicated generally by reference numerals 61, 62, convey by air blast the grass clippings from cutter bar 26 up above platform 12 and thence down into a trough 63 which is disposed immediately above column 41. Trough 63 preferably extends entirely across the machine and the ducts 61, 62, are on either side of column 41. Hence, to feed the grass clippings centrally into the column there is provided a double helix conveyor 64, 64a, having a lefthand feed on one side of the machine and a righthand feed on the other side, supported by shaft 66 which is driven at one end from shaft 33 by means of belt 67. Deflectors 68 deflect the clippings downwardly through opening 69 in the top of column 41.

Dogs 131 extend into column 41 from either side (see FIG. 4) and are of a resilient material. Dogs 131 resist longitudinal movement of clippings along column 41 as ram 42 reciprocates and hence cause the clippings to be compacted as baling progresses. It will be understood that this feature of the invention is subject to wide variation, as well understood in the baling art.

One means of binding the clippings after they have been compressed into individual bricks is illustrated in the accompanying drawings and hereinafter described. It will be understood that this feature of the invention is also subject to wide variation.

A magazine 71 is mounted above and to one side of baling column 41 and provided with a removable cover 72. In magazine 71 is a plurality of long wire staples 73 of the type used to staple papers and also used in the box art.

A pusher plate 74 is located within magazine 71 and biased toward the center of the machine by means of spring 76. Magazine 71 and the top of column 41 are provided with aligned openings 77 (see FIG. 4) for discharge of a single staple. Vertically reciprocal drive bar 78 having depending inwardly facing channel guides 79 on either end of the magazine 71 separate an individual staple 73 from the stack of staples in magazine 71 and force and guide the staple downward through opening 77 into column 41. The length between the legs of staple 73 determines the length of the brick of clippings formed. In order to bend outwardly the lower ends of the legs of staples 73, anvil-shaped grooves 81 (see FIG. 6) are formed in the floor of column 41 immediately below magazine 71. Hence, as the staples are driven down by bar 78 and guided by guides 79, the lower ends of the legs of the staples encounter the anvil portions 81 and are bent outwardly as is best shown in FIG. 6. To improve the action of staples 73 there is provided a roll 82 of somewhat thick material such as heavy paper or foil suspended by means of bracket 83 below column 41, the material having a width of about ¼". The web of material is brought up from roll 82 through opening 84 in the bottom of platform 12 and column 41 and inside and forwardly along the floor of column 41. Hence as the staples 73 are depressed through the clippings in the baling column, the lower ends of the legs penetrate the strip of material from roll 82 and are stapled through it. The sections of material are cut off by means of a cut-off blade 86 on the lower edges of forward guide 79 which shears against an opening 87 in the bottom of column 41 to cut off portions of the material from roll 82.

Bar 78 may be manually depressed but in the form of the invention herein illustrated it is automatically actuated. For such purpose, a horizontal, lateral offset 91 is formed on bar 78 extending out through an opening 92 in the side of the column. Vertical pins 94 passing through extension 91 guide and align the mechanism. Springs 96 bias offset 91 and bar 78 to upper or retracted position. Downward movement of extension 91 is accomplished by means of a cable 97 which passes vertically downwardly and around pulley 98 and is thence attached to the forward end of horizontally, longitudinally reciprocating slide 99. Slide 99 is guided by means of brackets 101 on the side of column 41 and is so guided that it may move in or out relative to column 41 and biased toward column 41 by means of springs 102 bearing against inward facing channel 103 in which slide 99 reciprocates (see FIG. 7).

Adjacent its rearward end, slide 77 has an inwardly pointed latch 106 capable of penetrating inwardly through an opening 107 extending longitudinally horizontally in the side of column 41 (see FIG. 5). A complementary notch 108 is formed in the side of ram 42 to receive latch 106 when it is in its inward position. The shapes of notch 108 and of latch 106 are such that on the rearward stroke of ram 42 slide 99 is carried rearwardly, thereby pulling cable 97 down and causing one staple 73 to be driven downwardly through the column. At the rear of the opening 107 is a ramp 109 in the side of column 41 which moves slide 99 sidewards so as to disconnect latch 106 from ram 42 at the end of its rearward stroke, thereupon retracting springs 96 return bar 78 to upward position.

It is necessary to drive a staple 73 through the column only after sufficient clippings have been accumulated and compressed within the column to make a convenient size brick. In other words, it is not desirable that a staple 73 be driven for each reciprocation of ram 42. To govern this movement, a vertically reciprocal retractor 111 is mounted on the side of the column and its sliding movement controlled by pin 112. When member 111 is in down position, it forces slide 99 outwardly against the force of spring 102. The rearward edge 112 of member 111 is beveled as is the forward edge 113 of slide 99.

Bale length measuring spur 116 extends partially into column 41 and is rotated clockwise as viewed in FIG. 6 as bale 117 is formed in column 41. Shaft 118 on which spur 116 is mounted carries disk 119 having cam lobe 120 which engages lever 121 pivoted to the side of column 41 by pin 122. Lobe 120 is loose on shaft 118 and its rotation relative to disk 119 is restrained by pins 124 and 126 in disk 119. Lobe 120 is biased by spring 127 in the direction of rotation of disk 119. Hence when lobe 120 first contacts lever 121 it remains stationary and spring 127 stretches. When disk 119 turns sufficiently, pin 124 engages lobe 120 and thus depresses lever 121. As soon as the lever is depressed, spring 127 pulls lobe 120 ahead, permitting lever 121 to return to initial position. The opposite end of lever 121 is connected to release ramp 111 by pin 123. When ramp 111 is raised, slide 99 moves inwardly toward column 41 so that latch 106 engages recess 108 in ram 42 on the next retractive stroke of ram 42. Thus a staple 73 is driven out of magazine 71 through the bale 117. At the end of the stroke of plunger 42 latch 106 is unlatched from plunger 42 by reason of the beveled shapes 106 and 109. Upon release of slide 99, springs 96 retract the stapling mechanism and also return slide 99. Release ramp 111 has now returned to down position. The bevel 113 on slide 99 and cooperating bevel 112 on the edge of ramp 111 forces slide 99 outwardly against the force of springs 102. Thus slide 99 is held unlatched until a new bale is formed and spur 116 rotated the required distance.

In operation, the mower is operated and guided by handles 18 in normal manner. Grass is clipped by interaction of blades 27 and bar 26 and blown by the fan action of reel 28 up between ducts 61, 62 to trough 63. Conveyors 66, 66a move the clippings centrally and deflectors 68 push the clippings down into openings 69 in the top of column 41 where they drop in front of ram 42 on its next retractive stroke. On the subsequent compressive stroke ram 42 forces the clippings forward against the resistance of column 41, thereby compressing the clippings. Successive strokes of ram 42 gradually form a bale 117 or brick of clippings. Spur 116 is turned as the brick is formed and when of desired length a staple 73 is forced out of magazine 71 through the bale and through foil tape 82. The ends of staple 73 are bent outwardly by anvils 81 and cutter 86 shears foil 82. The operation whereby the staples 73 are discharged has already been described in detail. Continued operation of the machine forms a new bale 117 which pushes the previous bale out the end of column 41 and into basket 21.

It will thus be seen that instead of the usual clippings loose in basket 21, the present invention forms a plurality of compressed bricks 117 held together by staples 73 and foil or paper strip 82. Such bales are easily handled and their disposal creates no problem. The consistency of normal grass clippings holds them in bale 117 with the simplified bale tying means herein described.

What is claimed is:

1. In a device of the character described, a frame, a prime mover on said frame, a cutter reel having blades rotatable in said frame in a horizontal direction substantially perpendicular to said axis, a cutter bar fixed on said frame, means for revolving said reel from said prime mover, a baling chamber mounted on said frame above said reel and having a feed opening, duct means for conveying clippings from adjacent said cutter bar into said feed opening, a plunger in said baling chamber, means for reciprocating said plunger from said prime mover in a horizontal direction substantially perpendicular to said axis to compress grass clippings in said baling chamber, and binder means for securing compressed clippings in said chamber into a convenient bale.

2. A device according to claim 1 in which said cutter reel is formed as a fan to blow said clippings through said duct means.

3. A device according to claim 2 which further comprises a transverse trough substantially parallel to said axis above said chamber having an opening in registry with said feed opening and arranged to receive the discharge of said duct means, conveyor means in said trough feeding clippings toward said feed opening, and means for driving said conveyor means from said prime mover.

4. A device according to claim 1 in which said baling chamber discharges at the front of said frame and which further comprises a basket supported from said frame longitudinally forwardly of said chamber to receive bales discharged from said chamber.

5. In a device of the character described, a frame, a prime mover on said frame, a cutter reel having blades rotatable in said frame about an axis, a cutter bar fixed on said frame, means for revolving said reel from said prime mover, a baling chamber mounted on said frame above said reel and having a feed opening, duct means for conveying clippings from adjacent said cutter bar into said feed opening, a plunger in said baling chamber, means for reciprocating said plunger from said prime mover in a horizontal direction substantially parallel to said axis to compress grass clippings in said baling chamber, and binder means for securing compressed clippings in said chamber into a convenient bale, said binder means comprising a magazine for staples above said chamber, staple driving means for driving a staple from said magazine down through said chamber through clippings compressed in said chamber by said plunger, staple bending means at the bottom of said chamber, and actuating means for said staple driving means actuated intermittently from said plunger.

6. A device according to claim 5 which further comprises a roll of tape below said chamber, means guiding said tape into said chamber over said staple bending means whereby staples passing through said chamber penetrate said tape and are bent under said tape.

7. A device according to claim 6 which further comprises shearing means on said staple driving means to shear said tape when said staple driving means is actuated.

8. A device according to claim 5 which further comprises cooperable latch means on said plunger and said staple driving means and means responsive to quantity of clippings compressed for engaging said latch means to actuate said staple driving means for a single retractive stroke of said plunger.

References Cited by the Examiner
UNITED STATES PATENTS

| | | | |
|---|---|---|---|
| 963,775 | 7/1910 | Killman | 100—43 |
| 2,735,359 | 2/1956 | Tarbox | 100—4 |
| 2,811,004 | 10/1957 | Borrow | 56—24 |
| 2,843,989 | 7/1958 | McClellan | 56—1 |

ANTONIO F. GUIDA, *Acting Primary Examiner.*

ABRAHAM G. STONE, *Examiner.*